United States Patent [19]
King

[11] Patent Number: 5,416,282
[45] Date of Patent: May 16, 1995

[54] NEAR-SURFACE SEISMIC INVESTIGATION SOURCE APPARATUS

[76] Inventor: John M. King, 4326 Clearwater Lp., Lacey, Wash. 98503

[21] Appl. No.: 231,162

[22] Filed: Apr. 22, 1994

[51] Int. Cl.[6] .............................................. G01V 1/02
[52] U.S. Cl. .................................................... 181/113
[58] Field of Search ................. 181/113, 118; 367/145

[56] References Cited

U.S. PATENT DOCUMENTS 4,043,420  8/1977  Zens et al. .......................... 181/118
4,189,026  2/1980  Elliot et al. ........................ 181/118

Primary Examiner—Daniel T. Pihulic

[57] ABSTRACT

The apparatus consists of a cylindrical combustion chamber supported on the top end of a cylindrical shock tube. The lower end of the shock tube is held a distance from the ground on which the apparatus is used inside a conical enclosure. The conical enclosure is attached to a circular base with a circular hole at its center. The interior of the conical enclosure is covered by a layer of acoustical insulation. The diameter of the shock tube is less than the diameter of the combustion chamber. The cone angle of the conical enclosure is about 50°.

4 Claims, 1 Drawing Sheet

NEAR-SURFACE SEISMIC INVESTIGATION SOURCE APPARATUS

BACKGROUND OF THE INVENTION

FIELD: This invention relates to the field of land geophysical seismic investigation, and specifically to combustible gas seismic source apparatuses and methods of sensing and recording near-surface reflected seismic energy.

Near-surface geophysical seismic investigations are differentiated from shallow seismic investigations in that near surface investigations are most often directed to the geology of the near surface weathered layer. Shallow seismic investigations are directed to gathering information about layers below the weathered layer. Near-surface seismic investigations are conducted with a light weight source suited to hand-portable operations in either urban or rural settings. These apparatuses rely on the repeatability of low power energy sources which allow for a summing of reflected traces which enhance the signal to noise ratio of the traces.

The problems associated with near-surface seismic investigations also differ from those of shallow seismic investigations in that the weathering layer is often comprised of low velocity material. This low velocity material stretches out the returning reflected wave in time where it is subjected to destructive interference from groundroll. Groundroll is comprised of high-amplitude, low frequency energy which is the result of elastic rebound from the impact of a pressure pulse on or near the earth's surface. Groundroll energy is generated by source apparatuses currently being used in near-surface seismic investigations. These types of apparatuses include vibrating masses, pressurized gases in combination with liquids, combustible gas mixtures, sledge hammers, weight drops, shotguns and modified rifles.

Various gas exploding pulse sources have been developed and successfully employed in both shallow and deep seismic investigations. Most notable are U.S. Pat. Nos. 3,235,027 of L. G. Kilmer, 3,361,226 of S. E. Szasz and 4,043,420 of R. J. L. Zena and W. W. Horsman. These apparatuses are powered by the combustion of pre-mixed gases within an enclosed combustion housing which is connected to a rigid bottom reaction plate. The expansion of gases, during combustion, imparts a downward force on the rigid reaction plate which is pressed against the ground. The pulse of energy caused by the movement of the plate initiates the seismic wave.

These prior art energy pulse sources powered by explosions do not address the destructive interference of groundroll. The use of a reactive plate to initiate a seismic wave energy increases the amplitude and duration of the groundroll. Signals sensed from groundroll interfere with signals of interest which are produced while the groundroll is occurring, not afterward.

One approach to the generation and earth coupling of seismic waves is to use an energy focusing device. One such device, shown in U.S. Pat. No. 3,275,098 of W. S. Filler, requires a firing chamber which opens into a shock tube. The shock wave, which is generated by an explosive device in the firing chamber, is directed to the earth's surface through a tubular or conical shock tube.

A major limitation of the above described apparatus and its inherent method in use for near-surface seismic investigations is that if the shock tube is conical portions of the energy are reflected back to the apex of the cone and back to the ground, causing additional waves to strike the surface and increase the duration of the destructive interference of groundroll.

Another serious limitation of the method and apparatus exemplified by Filler is that relatively low energy but highly expedient explosives such as combustible gas mixtures do not produce sufficiently high velocity differential pressure ridges; i.e. shock waves.

Accordingly, the prime objective of the subject invention is to provide seismic source apparatus, the operation of which is relatively free of the influences of groundroll phenomena. A second objective is that satisfactorily high energy shock waves can be produced using relatively low energy explosives. A third objective is to limit the amount of recoil of the apparatus relative to the power of the explosions.

SUMMARY OF THE INVENTION

The subject invention is a hand portable apparatus used in near-surface seismic investigations. The apparatus comprises a cylindrical combustion chamber supported on the upper end of a cylindrical shock tube. The diameter of the shock tube is less than the diameter of the combustion chamber. The lower end of the tube is supported by a frustum of a conical shell, termed a cone, with the centerline of the cone coincident with the centerline of the shock tube. The shock tube extends into the cone such that the distance of the end of the shock tube from the plane of the base of the cone is about 1/5 the distance from the base of the cone to its intersection with the shock tube. The interior of the cone is covered by a layer of acoustical insulation material. The base of the cone is attached to a circular plate with a hole at its center. The outside diameter of the plate is equal to the diameter of the base of the cone. The diameter of the hole is equal to or larger than the diameter of the shock tube, preferably $2\frac{1}{2}$ times the diameter of the shock tube. The diameter of the base of the cone, in a preferred embodiment of the invention, is 5 times the diameter of the shock tube and the cone angle is 50°.

In operation, a mixture of gas and air is introduced into the combustion chamber and ignited, using apparatus and techniques well known in the art. The explosion causes the air and gas mixture to expand, creating pressure in the combustion chamber and generation of a shock wave which travels down the tube with a sharp change in pressure across the face of the wave in the direction of its motion. The ratio of the energy level of the wave to the energy released by the explosion is significantly increased by making the shock tube diameter smaller than the diameter of the combustion chamber. Because the end of the shock tube is away from the ground surface on which the apparatus is placed and not connected to the plate, there is minimal recoil of the apparatus and the wave energy is transmitted into the ground and reflected from the ground, some of it producing the desired spherical, outwardly radiating acoustical wave and producing some groundroll phenomena. Some of the energy is reflected into the cone. Some of the reflected energy is absorbed in the insulation and some of it produces secondary groundroll phenomena 180° out of phase with the primary phenomena and serving to cancel much of the energy of the primary groundroll as it reaches the apparatus.

The method of the described apparatus comprises the steps of:

(a) In apparatus used for near surface seismic investigations, such use generating primary groundroll phenomena, providing means for generating secondary groundroll phenomena which ameliorate the effects of the primary groundroll phenomena.

The invention is described in more detail below with reference to the attached drawings.

DETAILED DESCRIPTION OF THE INVENTION

Figure 1:
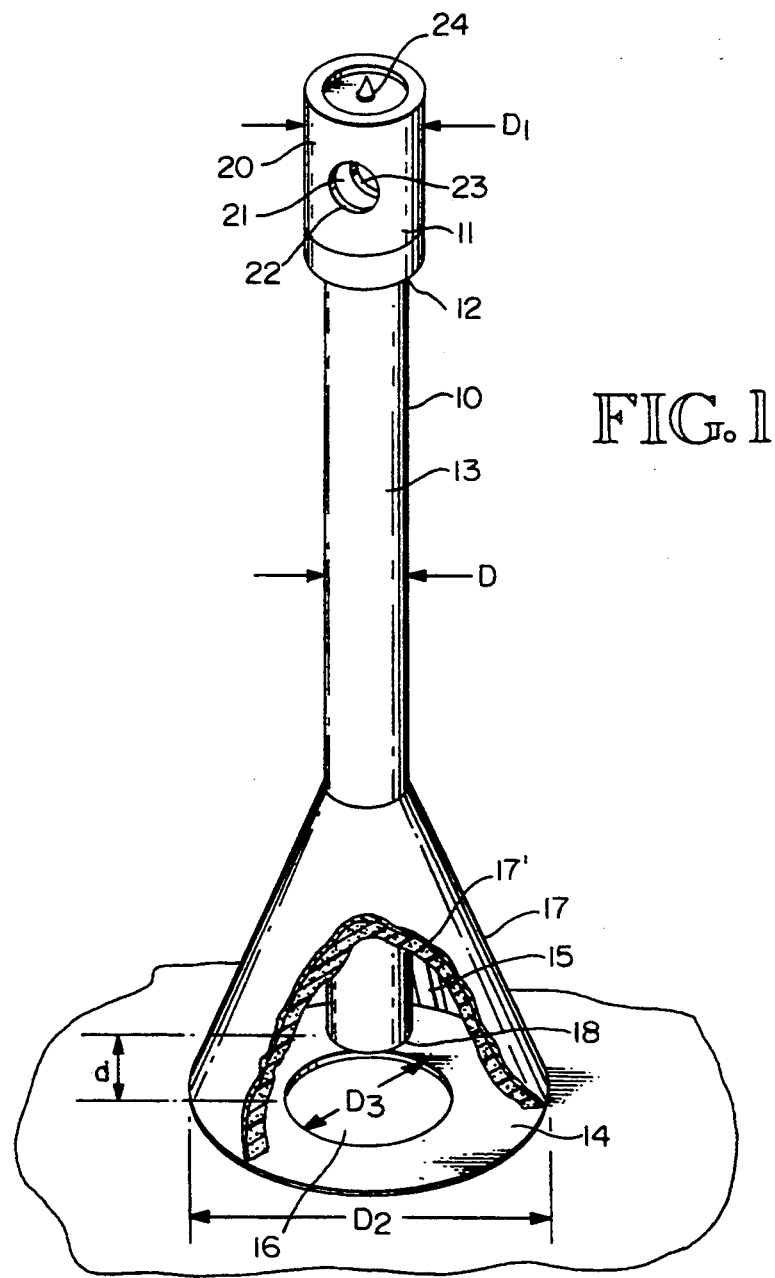
FIG. 1 is a partially sectioned, semi-schematic isometric illustration of a preferred embodiment of the subject invention.

The subject invention is a hand portable apparatus used in near-surface seismic investigations. A preferred embodiment of the apparatus 10 is shown in FIG. 1. It comprises a cylindrical combustion chamber 11 supported on top end 12 of a cylindrical shock tube 13. Diameter D of the shock tube is in a range of 0.5 to 0.9 of diameter $D_1$ of the combustion chamber, with 0.75 preferred. The shock tube is supported on a tripod attached to base plate 14, with one leg 15 of the tripod showing in this view. The shock tube is perpendicular to the base plate which rests on ground surface 16 during use of the apparatus. Conical enclosure 17 rests on the tripod and base plate and is attached to the base plate and shock tube. The enclosure is lined with acoustical insulation 17'. End 18 of the shock tube is a distance d from the ground and distance d is in a range of $\frac{1}{3}$ to $\frac{1}{8}$ of the diameter $D_2$ of the base plate with 1/5 preferred. The diameter $D_3$ of hole 19 in the center of the base plate is in a range of $\frac{1}{8}$ to $\frac{3}{4}$ of $D_2$ with $\frac{3}{8}$ preferred.

The combustion chamber comprises inner and outer cylindrical casings 20 and 21. The outer casing is rotatable relative to the inner casing so that holes 22 and 23 function as the exhaust port for used gases, the port being opened and closed by rotation of the outer casing. Spark plug 24 ignites the mixture of explosive gas and air admitted to the combustion chamber using apparatus and techniques well known in the art. The explosion causes a shock wave to pass down the shock tube and deliver energy to the ground for purposes of the seismic investigation and generating primary ground waves which can interfere with the sensing of the results of the transfer of energy into the ground. Some of the energy is reflected into the conical enclosure. Some of the reflected energy is absorbed by the insulation and some generates secondary ground waves which are 180° out of phase with the primary ground waves and significantly reduce their interference with the sensing of test results.

The fact that the energy is delivered directly to the ground and not transferred through a base plate significantly reduces the recoil of the apparatus during use.

It is considered to be understandable from this description that the subject invention meets its objectives. It provides seismic source apparatus having operation relatively free of the influences of groundroll. The level of energy of the shock wave relative to the energy of the explosion is augmented by making the shock tube diameter less than the diameter of the combustion chamber. The recoil of the apparatus is significantly reduced from recoil experienced in apparatus in which the energy is delivered to the ground by a base plate.

It is also considered to be understood that while one embodiment of the invention is disclosed herein, other embodiments and modifications of the one described are possible within the scope of the invention which is limited only by the attached claims.

I claim:

1. Apparatus, used on a ground surface, for generating seismic waves in said ground, said apparatus comprising:

a shock tube, means for supporting said shock tube vertically above said ground surface, said means for supporting comprising a conical assembly having a base plate attached to said conical assembly, said shock tube having an upper end and a lower end, said apparatus further comprising a combustion chamber attached to said upper end of said shock tube, means for providing air and gases to said combustion chamber, means for admitting said air and gases to said combustion chamber, means for mixing said gases, means for combusting said gases, producing combustion and residual gas mixture, means for exhausting said residual gas mixture, whereby said combustion imparts a differential pressure ridge to said shock tube and said pressure ridge travels down said shock tube and impacts said ground surface, said lower end of said shock tube extending into said conical assembly and being positioned a first distance away from said ground surface, said combusion chamber having a first diameter and said shock tube having a second diameter and said first diameter being greater than said second diameter.

2. The apparatus of claim 1 in which said conical member is internally acoustically insulated.

3. The apparatus of claim 1 in which said base plate is circular and has a circular hole centered in it.

4. The apparatus of claim 3 in which said conical chamber is internally acoustically insulated.

* * * * *